United States Patent
Cattaneo et al.

(10) Patent No.: US 12,248,942 B2
(45) Date of Patent: Mar. 11, 2025

(54) SYSTEM AND METHOD FOR AUTOMATICALLY EVALUATING AND SCORING THE QUALITY OF AGENT-CUSTOMER INTERACTIONS

(71) Applicant: Calabrio, Inc., Minneapolis, MN (US)

(72) Inventors: Laura Cattaneo, Rochester, MN (US); Boris Chaplin, Medina, MN (US); Kyle Smaagard, Forest Lake, MN (US); Chris Vanciu, Isle, MN (US); Dylan Morgan, Minneapolis, MN (US); Catherine Bullock, Minneapolis, MN (US)

(73) Assignee: Calabrio, Inc., Minneapolis, MN (US)

( * ) Notice: Subject to any disclaimer, the term of this patent is extended or adjusted under 35 U.S.C. 154(b) by 0 days.

(21) Appl. No.: 18/069,983

(22) Filed: Dec. 21, 2022

(65) Prior Publication Data
US 2024/0211960 A1      Jun. 27, 2024

(51) Int. Cl.
*G06Q 10/0639*    (2023.01)
*G06F 40/279*      (2020.01)
*G06Q 30/015*      (2023.01)

(52) U.S. Cl.
CPC ......... *G06Q 30/015* (2023.01); *G06F 40/279* (2020.01); *G06Q 10/06398* (2013.01)

(58) Field of Classification Search
CPC ............. G06Q 10/063; G06Q 10/0639; G06Q 10/06398; G06Q 30/015; G06F 40/20; G06F 40/279
See application file for complete search history.

(56) References Cited

U.S. PATENT DOCUMENTS 8,478,621 B1 *   7/2013  Plummer ............... G06Q 30/01
                                                              705/7.42
10,216,837 B1 *  2/2019  Saikia ..................... G06F 16/35
(Continued)

OTHER PUBLICATIONS

Caporali de Andrade, R. (2020). Data-driven operations management for multichannel customer support services (Order No. 28091950). Available from ProQuest Dissertations and Theses Professional. (2456446667). (Year: 2020).*

(Continued)

*Primary Examiner* — William S Brockington, III
(74) *Attorney, Agent, or Firm* — Faegre Drinker Biddle & Reath

(57) ABSTRACT

The present disclosure relates to automatically evaluating an agent-customer interaction utilizing aspects of machine learning to score the quality of the interaction. In some embodiments, one or more machine learning models are utilized to generate an interaction quality score which is a comprehensive evaluation of agent performance during the interaction. The interaction quality score is a combination of two sub-scores, a conversation score and service score which are each based on one or more dimension scores. The conversation score is a measure of how well the agent engages with the customer during the interaction. The service score is an evaluation of the quality of the agent's service during the interaction in terms of customer's perception of the agent's performance. Each of the conversation score and service score are determined by an analysis of one or more dimensions such as fluency, relevance, appropriateness, informativeness, assurance, responsiveness, empathy, compliance, and sentiment.

20 Claims, 6 Drawing Sheets

(56) References Cited

U.S. PATENT DOCUMENTS

| | | | |
|---|---|---|---|
| 10,896,428 B1 | 1/2021 | Balasubramaniam et al. | |
| 11,418,652 B1 | 8/2022 | Tron et al. | |
| 2008/0080385 A1 | 4/2008 | Blair | |
| 2010/0138282 A1 | 6/2010 | Kannan et al. | |
| 2017/0272571 A1* | 9/2017 | Spiessbach | H04M 3/5175 |
| 2019/0180175 A1* | 6/2019 | Meteer | G10L 15/26 |
| 2019/0325897 A1 | 10/2019 | Liu et al. | |
| 2019/0377785 A1* | 12/2019 | N | G06F 40/20 |
| 2021/0158636 A1* | 5/2021 | Olshansky | G06Q 10/1053 |
| 2021/0258424 A1* | 8/2021 | Brown | H04M 3/5175 |
| 2021/0266407 A1* | 8/2021 | Burton | G06Q 30/016 |
| 2021/0280207 A1* | 9/2021 | Pisczak | G06F 40/20 |
| 2022/0230116 A1* | 7/2022 | Dubey | G06Q 10/06398 |
| 2022/0253784 A1* | 8/2022 | Mullinjer | G06Q 10/105 |
| 2023/0317064 A1* | 10/2023 | Puri | G10L 25/51 |
| | | | 704/9 |

OTHER PUBLICATIONS

European Search Report for EP Patent Application No. 23219361.5, Issued on Feb. 5, 2024, 7 pages.

\* cited by examiner

SYSTEM AND METHOD FOR AUTOMATICALLY EVALUATING AND SCORING THE QUALITY OF AGENT-CUSTOMER INTERACTIONS

BACKGROUND

In service-based industries one of the foundational elements of business success is ensuring that each customer has a consistently high-quality experience interacting with enterprise employees. This is particularly true for contact centers, which are responsible for answering customer communications to resolve various issues as their primary business responsibility. Variations in customer service by employees and agents of a business have the potential to degrade customer experience below standards, increasing customer dissatisfaction. To ensure customer service standards are met, many businesses utilize interaction evaluation forms, with several questions to evaluate the agent-customer interaction. However, this evaluation method produces inconsistent results due to variations in customer feedback, lack of a comprehensive view of agent performance across multiple interactions, and human bias problems. Thus, it can be difficult to understand the quality of customer service being provided by agents individually and collectively. Ultimately, poor customer service across multiple interactions or agents can reduce business profitability if dissatisfied customers transition to other businesses with superior customer service.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relates to automatically evaluating an agent-customer interaction utilizing aspects of machine learning to score the quality of the interaction. In some embodiments, one or more machine learning models are utilized to generate an interaction quality score which is a comprehensive evaluation of agent performance during the interaction. The interaction quality score is a combination of two sub-scores, a conversation score and service score which are each based on one or more dimension scores. The conversation score is a measure of how well the agent engages with the customer during the interaction. The service score is an evaluation of the quality of the agent's service during the interaction in terms of customer's perception of the agent's performance. Each of the conversation score and service score are determined by an analysis of one or more dimensions such as fluency, relevance, appropriateness, informativeness, assurance, responsiveness, empathy, compliance, and sentiment.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exclusive examples are described with reference to the following figures.

DETAILED DESCRIPTION

Figure 1:
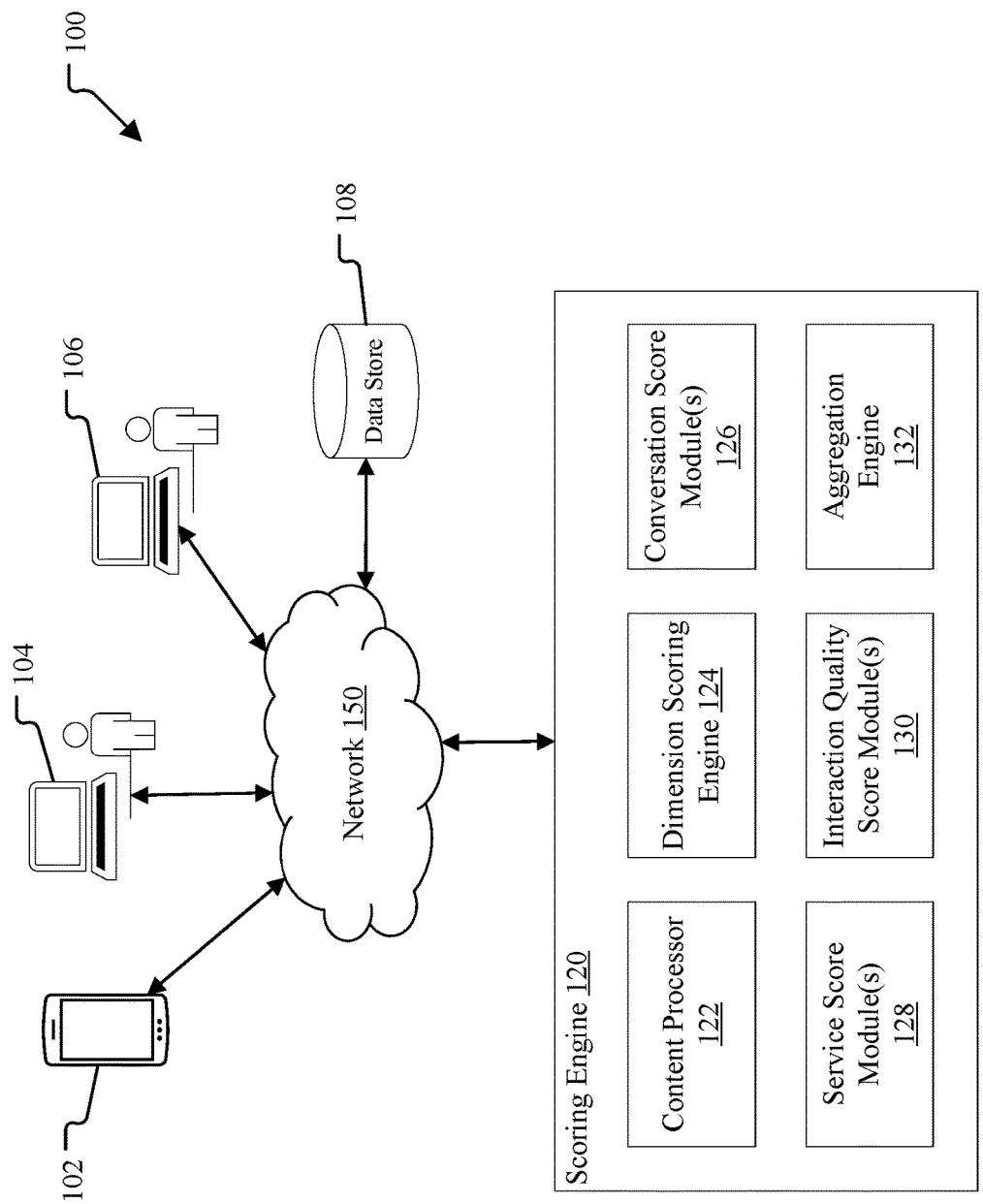
FIG. 1 is a diagram illustrating a system for evaluating agent performance with an interaction quality score, according to aspects described herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In embodiments, a customer may interact with an agent at a business, such as a contact center, about some issue and one or more topics related to the issue. The interaction may be initiated by either the customer or the agent, and the interaction may be recorded as a piece of content. In many instances, following the conclusion of the interaction a quality assurance professional, and/or a supervisor who is evaluating the interaction may be asked to manually fill out an interaction evaluation form. The interaction evaluation form may be unique to the business or an industry standard interaction evaluation form either of which commonly contain several questions relating to the quality of the agent's performance during the interaction.

However, the manual interaction evaluation process suffers from several issues. First is that the interaction evaluation form is incomprehensive meaning it does not gather enough meaningful information to generate a complete understanding of agent performance. The incomprehensive issue is often due to the fact that the form contains a relatively small number of questions that do not quantitatively measure the agent-customer interaction in a meaningful way. Second is an unscalable issue in the manual review process where only a small percentage of interactions are evaluated due to an inability to manually process the high volume of interactions. The unscalable issue creates gaps in a reviewers understanding of agent performance. With a manual review process it is difficult to scale up the number of interactions reviewed for a single agent due to the high volume of calls a single agent may be involved with, let alone scale up the total interaction volume across all agents. The primary concern with the second issue is inconsistency in agent performance that may be obscured due to the reviewer only looking at a small number of total agent calls. In this instance, an agent could have multiple high-performing interactions with customers that obscure inconsistent errors on high priority items or vice versa. In either case, the outcome of the reviewer's evaluation may change significantly if the full scale of agent interaction across all interactions had been reviewed. A third issue is that the manual review process suffers from a human bias problem because the manually completed interaction evaluation forms are subjectively completed by a human review process. Instances where a human is a primary reviewer commonly suffer from the human introducing skewness, subjectiveness, and halo bias problems into the conclusions reached by the evaluation. Again this issue results in an incomplete representation of an agent's actual performance across all interactions with the customers. If these issues are not recognized, what could be corrected with additional training may expand into a serious issue that could be difficult and costly to correct.

To address these issue, aspects of the present disclosure relate to a system and methods for automatically scoring the quality of an agent-customer interaction. In one embodiment, an interaction quality score may be determined using one or more natural language processing programs and/or machine learning models to analyze a piece of content. An interaction quality score is a comprehensive evaluation of agent performance during the interaction that may be generic and applies across industries. The interaction quality score is a combined value of a conversation score and a service score which are each based on one or more dimension scores. The conversation score is a measure of how well the agent engages with the customer during the interaction. The service score is an evaluation of the quality of the agent's service during the interaction in terms of customer's perception of the agent's performance. Each of the conversation score and service score are determined by combining one or more dimension scores. There are many dimensions which could be considered and scored such as fluency, relevance, appropriateness, informativeness, assurance, responsiveness, empathy, compliance, and sentiment. The dimensions may be further sub-divided into one or more metrics which further relate to how the dimension impacts the quality of the interaction. A dimension score is determined by combining one or more metric scores associated with the dimension. Once determined, any of the metric score, dimension score, conversation score, service score, and/or interaction quality score may be aggregated to evaluate and/or compare the performance between an agent across multiple interactions, a team of agents, an entire contact center, and/or multiple contact centers across any period of time and/or interactions.

The automatically determined interaction quality score provides substantial benefits by resolving the above stated problems with the manual review process. The incomprehensive issue is resolved in two ways. First, by applying a multi-dimensional framework to evaluate the agent-customer interactions. The multi-dimensional framework allows for the system designer to encompass the full scope of quality evaluation preferred by a business by simply including additional dimensions until the results are satisfactory. Second, aggregation provides a comprehensive view of performance beyond an individual interaction or agent that is otherwise difficult to gain through previous evaluation methods. To address the unscalable issue, natural language processing (NLP) tools, large language models, and other machine learning techniques are employed which enable every agent-customer interaction to be processed and scored automatically. Finally, the multi-dimensional framework applied greatly reduces the human bias issue for two reasons. First, because the dimensions are objectively scored by NLP tools and other machine learning models on one or more metrics which removes human scoring from the evaluation process. Second, bias is reduced because the dimension analysis method has high inner correlation which provides consistent and transparent measures across each dimension and the interaction quality score itself. Ultimately, the interaction quality score provides assurances to the business that interaction quality is high across all agents, and that any agents with instances of low-quality interaction will be identified and addressed through coaching and additional training.

FIG. 1 is a diagram illustrating a system for evaluating agent performance with an interaction quality score, according to aspects described herein. A system 100 may include a customer device 102, an agent device 104, a supervisor device 106, a data store 108, and a scoring engine 120 which communicate over a network 150. The scoring engine 120 may include a content processor 122, a dimension scoring engine 124, one or more of a conversation score module(s) 126, service score module(s) 128, interaction quality score module(s) 130, and aggregation engine 132. The conversation score module(s) 126, service score module(s) 128, and interaction quality score module(s) 130 are referenced as pluralities to account for the scoring engine 120 including one or more interaction quality score modules 130 based on business or industry requirements. In some instances, it may be preferable to include different kinds and quantities of models that are fine-tuned based on different performance dimensions to generate a specific interaction quality score within the scoring engine 120. In such an embodiment, multiple instances of a conversation score module 126 and service score module 128 may be included in the scoring engine 120 that correspond to a fine-tuned interaction quality score module 130. For ease of discussion, the description herein refers to a single conversation score module 126, service score module 128, and interaction quality score module 130, but features and examples of each are applicable to the plurality of instances that could be included in the scoring engine 120.

Scoring engine 120 may include one or more server devices, distributed computing platforms, cloud platform devices, processors, and/or other computing devices such as the content processor 122. Scoring engine 120, content processor 122, dimension scoring engine 124, conversation score module 126, service score module 128, interaction quality score module 130, and aggregation engine 132 communicate with data store 108, customer device 102, agent device 104, and supervisor device 106 via network 150.

In a typical use scenario, a customer may contact the contact center on customer device 102 and may be assisted by an agent on the agent device 104. In some instances, the agent's supervisor may be involved in the customer agent interaction either directly (e.g., speaking directly to the customer based on their request or for training purposes) or indirectly (e.g., to monitoring the interaction) via supervisor device 106. During the agent-customer interaction one or more issues and/or topics may be discussed and recorded as a piece of content and stored in data store 108. For example, the agent-customer interaction may occur as a voice call where the customer and agent are talking to each other, as a textual record (e.g., a transcript, an instant messaging chat in a chat window, an email exchange, etc.), as a combination of both voice and text, as a video conference where the agent and customer may see and speak to each other, and/or by some other means where the agent and customer may interact with each other over the network 150. In some embodiments, each instance of an agent-customer interaction over the course of an agent's shift may be recorded and the pieces of content stored on the data store 108. Additionally, each agent-customer interaction for each agent at the contact center may be recorded a piece of content and stored on data store 108. The metadata for each piece of content may also be stored on the data store 108. Following the conclusion of the agent-customer interaction the content can be utilized to evaluate the interaction quality of the agent.

In some embodiments, in order to determine an interaction quality score one or more of the dimension scoring engine 124, the conversation score module 126, service score model 128, and interaction quality score module 130 may need to analyze a text-based transcript labeled for speaker (e.g., agent, customer, and/or supervisor, etc.). If the piece of content to be evaluated is not already a transcript, then the scoring engine 120, upon receiving and/or accessing a piece of content from the data store 108, may use content processor 122 to process the content into a transcript. The content processor 122 may be designed to identify utterances of varying dimensions such as length of the utterance and connectivity between utterances within the transcript. In some embodiments, the content processor 122 may utilize a speech recognition engine, one or more a large language models, natural language processing, and/or other machine learning methods to identify utterances from a piece of content. The transcript remains connected to the piece of content where the content is the source document for the transcript. Once generated by the content processor 122, the transcript may be stored on data store 108. A transcript is a text-based record based on an agent-customer interaction which includes the spoken and written utterances of both the customer and agent labeled for who made the utterance, including a time stamp for when the utterance occurred. An utterance is an expression of something in speech or text from an individual which may occur as a statement, sentence, or any other segment of speech or text of varying length. The utterance does not need to be a complete sentence or thought. Abrupt verbal expressions, one person interrupting the other, slang and other colloquialisms may be considered utterances and be included in the transcript.

The dimension scoring engine 124 analyzes the content based on one or more dimension metrics to generate a dimension score for each of one or more dimensions considered. A dimension is a perspective from which the content may be analyzed and the agent-customer interaction may be evaluated. As such, a dimension encapsulates an aspect of the agent-customer interaction that is integral to evaluating the quality of an agent's performance. There could be many different dimensions included in the evaluation. Examples of dimensions include fluency, relevance, appropriateness, informativeness, assurance, responsiveness, empathy, compliance, and/or sentiment among many others which could be selected based on business and/or industry preferences. Each dimension is further broken down into one or more metrics which can be used to generate the relevant dimension score. A metric is a sub-component of a dimension further relating to how the dimension relates to the quality of the interaction. The metrics for each dimension may be scored by the dimension scoring engine 124.

To score the metrics and dimension the dimension scoring engine 124 may utilize one or more natural language processing algorithms and/or other machine learning methods such as linguistic inquiry and word count (LIWC), one or more of an automated dialogue metric (ADM), non-textual features, and/or a more than sentiment (MTS) program among others. It should be appreciated by one having skill in the art, that the dimension scoring engine 124 may apply the natural language processing algorithms and/or other machine learning methods individually and/or in some combination to a piece of content.

In one embodiment, the dimension scoring engine 124 could use a LIWC program to analyze the text of the content to calculate the percentage of words in each text that falls into over 100+ linguistic dimensions from the speaker. The LIWC analysis could indicate pro-social behavior based on various social, cognitive and affective patterns in the text by identifying how certain phrases and words are used in each context. A LIWC analysis could be utilized to score almost every dimension, such as fluency where the LIWC analysis could look for filler words that are not being super fluent or speaking in a super fluent way.

In a further embodiment, the dimension scoring engine 124 may utilize an ADM program to score the dimensions. There are twenty-three various ADMs which may be utilized to process a piece of content to understand the interaction of various speakers based on their dialogue. The focus of the ADM analysis is to determine if the agent is actually responding with a relevant utterance to the customer's utterance. For this reason, an ADM will be utilized to analyze the relevance dimension if it is included, but it may be utilized to score other dimensions and metrics as well such as fluency. Of the twenty-three ADMs at least the fine-grained evaluation of dialog (FED) ADM and graph-enhanced representations for automatic dialogue evaluation (GRADE) ADM may be utilized by the dimension scoring engine 124, if not others as well. FED is an unsupervised evaluation metric that calculates the likelihood of manually designed follow-up utterances to measure qualities of dialogue, such as specificity, relevance and fluency. In some embodiments, a model such as DialoGPT may be used for the evaluation. GRADE models topic transition dynamics in a dialogue by constructing a graph representation of the dialogue history. GRADE analyzes the interaction in a turn-by-turn basis and determines the relevance of an agent's responses for a customer's queries or statements.

In another embodiment, the dimension scoring engine 124 could use an MTS program to score the metrics and dimensions. An MTS program is a frequency-based NLP tool that analyzes textual data by quantifying the text structures to detect information density. When applied by the dimensions scoring engine 124, MTS assists in understanding the quality of information being provided by an agent throughout an agent-customer interaction. Of specific interest in this analysis is the quality of the agent at delivering boilerplate information as well as agent specificity about a particular subject. Boilerplate information is a measure of the general informativeness of an interaction based on what the agent communicates throughout the interaction. Boilerplate information is analyzed by looking at a combination of words that can be removed from a sentence without significantly changing the sentences original meaning. Analyzing boilerplate information in this way assists in determining the proportion of unique words and phrases uttered by an agent during the interaction relative to the typical phrases used in most similar interactions. Agent specificity is a measure of the specificity with which an agent provides information about a particular subject. Agent specificity is a proxy for useful, specific information provided by an agent as it relates to the specific topic the customer is referencing at a certain point in the interaction. A high scoring agent response to a problem will often include helpful information with specific details about the topic (e.g., price, dates, websites, contact information, etc.).

Examples of dimensions and related metrics which can be evaluated to generate a dimension score are provided below for fluency, relevance, appropriateness, informativeness, assurance, responsiveness, and empathy although this should not be taken as a comprehensive list as other dimensions and associated metrics could be included.

The fluency dimension analyzes if the speech of the agent is coherent. Metrics used to analyze fluency may include a fluency metric, a non-fluency metric, and speech rate among others. The fluency metric is generated from a FED analysis using the difference in below positive and negative next sentence prediction likelihood. Examples of a positive next sentence prediction are responsive utterances such as "That makes sense!" and "You have a good point." Conversely, examples of negative responsive utterances include "Is that real English?", "I'm so confused right now!" and "That makes no sense!" The non-fluency metric is a feature of "nonflu" which represents non-fluency from LIWC, by analyzing the content for non-fluency keywords such as "um" and "uh" to show a lack of fluency in an interaction. The higher the usage of non-fluency keywords by the agent, the less fluently the agent is speaking, which could make the customer feel the agent is not familiar with the topic being discussed. Speech rate is a measure of words per a unit of time which may be analyzed using non-textual features. Speech rates that are either too fast or too slow are not desired and could negatively impact the fluency of the conversation. Generally, the metrics considered in the fluency dimension are focused on how fluent the agent is during the interaction, with minimal analysis for customer fluency.

The relevance dimension analyzes if the topic or topics of the interaction are relevant to the issue or issues presented by the customer. The dimension scoring engine 124 may use one or more ADMs to analyze the interaction in a turn-by-turn basis and determine the relevancy of the agent's responses for the customer's queries or statements. Some metrics that may be considered using FED and GRADE. Of the 18 measurements generated from a FED analysis, the relevance score is used by the dimension scoring engine 124. The relevance score is generated using the difference in below positive and negative next sentence prediction likelihood. A positive next sentence utterance would be "that's what I meant" and "you have understood what I asked". A negative next sentence utterance would be "that's not what I meant", "that's not even related to what I said", "don't change the topic", and "why are you changing the topic". GRADE may be used in an interaction where an agent query is followed by a customer response to evaluate the relevance of the agent's next response to the round of conversation. For each round of agent query followed by a customer response a score would be generated. Once all scores are generated for each round a combined value of all rounds is calculated. In some embodiments, an average value for all rounds is calculated. Generally, the metrics considered in the relevance dimension are focused on if the query and the response are similar to each other. The metrics are utilized to order the most relevant responses and then determine if what the agent responded with was relevant or not.

The appropriateness dimension evaluates if the language used by the agent is professional. To evaluate appropriateness an LIWC model may be used to determine metrics including prosocial behavior, politeness, and swear words among others. The prosocial behavior metric represents behavior or referents that signal helping or caring about others, particularly at the interpersonal level. It is a measure of how much caring an agent expresses in their utterances while offering to help the customer. Examples of high scoring prosocial utterances include "love", "care", "help", "thank" and "please". The politeness metric is a measure of words suggesting adherence to social norms and manners. During an interaction, how politely an agent communicates can be an important measurement of whether the speech is appropriate. The politeness score is taken from the "polite" output from LIWC which contains keywords such as "thank", "please", "thanks", and "good morning" among others. The swear words metric is a measure of if the agent uttered any swear words during the interaction. In some embodiments, there could be a target value which is desired for the swear words, that may be set at a value greater than, equal to, and/or less than zero. In instances, a response could be scored off this with either a positive or negative result based on the comparison. For example, if the target value was set for zero swear words, a value above zero could be worse (e.g., one, two, or more swear words), and a value of zero could be better. In some embodiments, a weighted penalty will be applied to the appropriateness dimension score if the agent uses one or more swear words during the interaction.

The informativeness dimension evaluates if the information provided by the agent is rich and/or could have covered more ground based on the issues presented by the customer. MTS is used to evaluate the informativeness metrics which are boilerplate and specificity. The boilerplate metric measures the proportion of unique language used by an agent in one interaction relative to the language utilized in most other interactions. For example, if an agent is responding to a typical interaction without a unique topic to resolve, the agent will get a higher score for the boilerplate metric. Alternatively, if the agent is offering unique solutions to the customer, they will have a lower score for the boilerplate metric. Specificity measures the proportion of specific information being provided by an agent during an interaction. Examples of specific information that is being looked for during the evaluation include references to objects, dates, times, places, and other valuable information needed to resolve a specific customer issue. In some instances, the evaluation can target specific words as very high scoring based on their relevance in a certain industry or context, such as "variable interest rate loan" or "balloon payment" in the banking industry.

The assurance dimension evaluates if the agent's reasoning inspire trust and reduce uncertainty for the customer. A LIWC model may be used to evaluate assurance metrics including causation, insight, certitude, and customer assent. The causation, insight and certitude metrics are used to measure the cognitive thinking process of the agent as well as how convincing the information provided by the agent to the customer is. The more logical and more certain in an agent's speech, the more assurance is given. Customer assent is used as a measurement to whether the customer is satisfied in the conversation, by detecting how often the customer is agreeing with the agent's answer. The assurance metrics are an evaluation of if the agent is using language that provides assurance to the client that they are receiving effective assistance for their issue from the agent.

The responsiveness dimension evaluates if the agent responds promptly and without impatience to the customer. It also evaluates if the agent talks over the customer or responds when the customer is finished. One or more non-textual features may be used to evaluate responsiveness metrics including response time and hold time. The response time metric is a measure of the time from the last customer utterance to the agent's responsive utterance. The response time metric is a median value for all response times in the content. There are a variety of ways the response time metric can be scored, based on system design preferences. In some embodiments, there could be a range of target values defined for a response time which the response time metric can be compared against to score it. In this instance, if the response time metric falls within one target value range it may be a positive outcome while if it falls within a different target value range it could be a negative outcome. For example, a range of target values could be defined starting with a response time less than 0 milliseconds (ms) is a very bad score indicating the agent interrupted the customer and talked over them, a response time less than 100 ms is also a bad score verging on interruption and indicating the agent did not listen to the customer, a response time between 101 and 500 ms is the desired target value range for response time and a good score, a response time between 501 ms and 1 second is an acceptable score, but slightly worse indicating that the agent took too long to respond, and a response time greater than 1 second is also a bad score indicating that the agent took too long to respond. The actual response time, which could be 250 ms, would then be compared to the target value ranges, and in this instance the agent would receive a good score. Additionally, the response time may be a value greater than, equal to, and/or less than zero. The hold time metric is a measure of inordinately long pauses between the last customer utterance to the agent's responsive utterance. The length of an inordinate pause is variable and can be set based on business and/or industry standards. For example, a business may prefer to set the inordinate pause length as any agent responsive utterance that takes longer than ten seconds to be made from the previous customer utterance. In some embodiments, intervening customer utterances will not reset or negate an inordinate pause. For example, if the inordinate pause length is ten seconds and after five seconds with no response from the agent the customer states "Did you hear me?" that utterance from the customer is an intervening utterance that will not reset the evaluation. The agent would need to respond to the original utterance prior to ten seconds elapsing or they would receive a lower score for the hold time metric.

The empathy dimension evaluates how much understanding was expressed by the agent and does that understanding make the customer feel as if they and their issue were treated as important by the agent. A LIWC model may be used to evaluate one or more empathy metrics including drives, affiliation, achievement and attention. A LIWC model may output scores for each of drives, affiliation, and achievement which are measures of whether the agent is showing empathy and comforting customers. The drives, affiliation and achievement scores are based on the presence or absence of empathy keywords such as "we", "us", "our", "work", "help", better", and "best" among others. The use of these words by the agent are considered to create a feeling with the customer that the agent is trying to work with the customer to achieve a solution to their issue. The attention metric is based on the attention output score from a LIWC evaluation. The attention metric is a measure of agent attentiveness and focus to the customer's issue and by proxy the customer as well. Empathy keywords in this instance may include "look", "look for", "watch", and "check" among others. Content with many occurrences of empathy keywords will have higher scores for the empathy metrics. The empathy metrics are an evaluation of what language the agent used, specifically phrase usage and empathy keywords that impart empathy to the customer.

The dimension score generated by the dimension scoring engine 124, is a representation of the quality of the agent's performance for that dimension. Each dimensions score is a combination of the one or more metric scores for that dimension. There may be one or more dimensions considered by the dimension scoring engine 124 for each piece of content, and each dimension considered will have an independently determined dimension score. To calculate a dimension score, the dimension scoring engine 124 first generates a metric score for each metric associated with the dimension. For example, if the fluency dimension was being scored, initially scores would be generated for each of the fluency metric, non-fluency metric, and speech rate metric.

The dimension scoring engine 124 rescales the metric scores to a standardized unit of measurement to simplify calculating the dimension score. Rescaling is necessary because each of the metric scores is output by the model with a different unit of measurement which is difficult to use and compare in subsequent calculations. In some embodiments, after rescaling each of the metrics will be a continuous value from 0 to 10 with 0 being the worst and 10 being the best. If necessary, a metric score may be modified to ensure that less desirable outcomes is lower on the continuous value spectrum (e.g., closer to 0) and more desirable outcomes are higher on the continuous value spectrum (e.g., closer to 10). After rescaling, each of the metrics for each dimension should be a continuous value from 0 to 10 with a common unit of measurement from which the dimension score may be determined. In some embodiments, prior to calculating the dimension score, optional weights for each metric can be applied to account for certain metrics deemed more or less important than others in the total dimension calculation. In embodiments where weights are applied, the weight will be a value between zero and one because rescaled values are used. For example, in the fluency dimension greater weight may be applied to the fluency and non-fluency metrics than the speech rate metric, which would adjust the resultant dimension score to favor the results in the fluency and non-fluency metrics.

The dimension score is calculated by combining the rescaled metric scores. In some embodiments, this may involve determining an average or weighted average of the rescaled metric scores. For example, consider a fluency dimension with a rescaled fluency metric value of 8, a rescaled non-fluency metric value of 4, and a rescaled speech rate metric value of 6. The combined metric score would be 18 with an unweighted average fluency dimension value of 6. However, if the fluency and non-fluency metrics were given a weight of 0.6, then the weighted rescaled fluency and non-fluency metrics would have values of 4.8 and 2.4 respectively, with a weighted fluency dimension score of 4.4. This process would be repeated for each metric and dimension included. In other embodiments, determining the dimension scores involves using a ranking system to rank the scores, and/or by using a threshold-based system to combine scores above a certain threshold. Once generated, the one or more dimension scores may be utilized to determine the conversation score and the service score.

The conversation score module 126 determines the conversation score as a combination of one or more dimension scores. In some embodiments, combining the dimension scores involves determining an average value of the dimension scores, determining a weighted average of the dimension scores, using a ranking system to rank the scores, and/or using a threshold-based system to combine scores above a certain threshold. The conversation score is an evaluation of how well an agent engages with a customer during an interaction. The conversation score is focused on understanding the conversation from the agent's perspective. While any of the dimension scores may be utilized to generate the conversation score, in a preferred embodiment the dimension scores for fluency, relevance, and appropriateness are used to generate the conversation score. In alternative embodiments, the conversation score could be generated using dimension scores for fluency, relevance, and responsiveness. Prior to calculating the conversation score the one or more dimension scores are rescaled into a common measurement scale, as described above. In some embodiments, the dimension score may be an average value of one or more dimension scores. In further embodiments, the dimension scores may be optionally weighted, as described above, then used to generate a conversation score that is a weighted average of the dimensions scores.

The service score module 128 determines the service score as a combination of one or more dimension scores. In some embodiments, combining the dimension scores involves determining an average value of the dimension scores, determining a weighted average of the dimension scores, using a ranking system to rank the scores, and/or using a threshold based system to combine scores above a certain threshold. The service score is an evaluation of the quality of the agent's service during the interaction in terms of customer's perception of the agent's performance. While any of the dimension scores may be utilized to generate the service score, in a preferred embodiment the dimension scores for informativeness, assurance, responsiveness, and empathy are used to generate the service score. In alternative embodiments, the service score could be generated using dimension scores for informativeness, responsiveness, empathy, and sentiment. Prior to calculating the service score the one or more dimension scores are rescaled into a common measurement scale, as described above. In some embodiments, the service score may be an average value of one or more dimension scores. In further embodiments, the dimension scores may be optionally weighted, as described above, then used to generate a service score that is a weighted average of the dimensions scores.

The interaction quality score module 130 determines the interaction quality score as a combination of the conversation score and service score. The interaction quality score is a comprehensive evaluation of agent performance during an agent-customer interaction that is generalizable across many industries for evaluating agent performance and improving customer service. Prior to calculating the interaction quality score, the one or more dimension scores are rescaled by the interaction quality score module 130 into a common measurement scale, as described above. In some embodiments, the interaction quality score is determined by taking an average value of the conversation score and service score. In further embodiments, either or both of the conversation score and service score may be optionally weighted, as described above, then used to generate an interaction quality score that is a weighted average of the conversation score and service score. In further embodiments, the interaction quality score is determined using a ranking system to rank the scores, and/or by using a threshold-based system to combine scores above a certain threshold. The scoring engine 120 may store one or more of the metric scores, dimension scores, conversation score, service score, and/or interaction quality score in the data store 108. The scoring engine 120 may generate a report detailing the dimensions utilized and scoring process performed to generate the interaction quality score. The report may be stored on data store 108 and/or sent to one or both of the supervisor device 106 and agent device 104 for review.

In some examples, a supervisor may want to make an aggregated evaluation and/or comparison in performance between an agent across multiple interactions, a team of agents, an entire contact center, multiple contact centers. In these instances, based on the scope of the aggregated evaluation a plurality of transcripts may be processed by the scoring engine 120, as discussed, to determine a plurality of metric scores, dimension scores, conversation scores, service scores, and/or interaction quality scores. These scores may be stored in the data store 108. Based on the scope of the aggregated evaluation, an aggregation engine 132 may utilize one or more of the metric scores, dimension scores, conversation scores, service scores, and/or interaction quality scores to generate aggregated values for any of the scores. The aggregation may occur across any period of time and/or number of interactions based on reviewer preferences as well as any score type meaning individual metric scores may be aggregated up to and including aggregating interaction quality scores. The aggregation engine 132 combines the selected scores to generate an aggregated score. In some embodiments, combining the selected scores involves determining an average value of the selected scores, determining a weighted average of the selected cores, using a ranking system to rank the selected scores, and/or using a threshold-based system to combine scores above a certain threshold.

The network 150 may comprise one or more networks such as local area networks (LANs), wide area networks (WANs), enterprise networks, the Internet, etc. and may include one or more of wired, wireless, and/or optical portions. It should be appreciated that while multiple agents and supervisors each utilizing an agent device 104 or supervisor device 106 may each work at a contact center, they do not need to be geographically collocated, but rather may be geographically dispersed but connected via network 150.

In aspects, the customer device 102, agent device 104, and supervisor device 106 may be any device that can receive, process, modify, and communicate content on the network 150. Examples of a customer device 102, agent device 104, and supervisor device 106 include a mobile computer or mobile computing device (e.g., a Microsoft® Surface® device, a laptop computer, a notebook computer, a tablet computer such as an Apple iPad™, a netbook, etc.), or a stationary computing device such as a desktop computer or PC (personal computer), telephone, mobile device, and/or a wireless device where a customer, contact center agent, and/or contact center supervisor may interact with each other. Customer device 102, agent device 104, and supervisor device 106 may be configured to execute one or more software applications (or "applications") and/or services and/or manage hardware resources (e.g., processors, memory, etc.), which may be utilized by users of the customer device 102, agent device 104, and supervisor device 106.

The customer device 102, agent device 104, and supervisor device 106 may include an application (not pictured) which displays content for use on the customer device 102, agent device 104, and supervisor device 106 and for communication across the network 150. The application may be a native application or a web-based application. The application may operate substantially locally to the customer device 102, agent device 104, and supervisor device 106 or may operate according to a server/client paradigm in conjunction with one or more servers (not shown). The application may be used for communication across the network 150, to engage in customer-agent interactions, and/or evaluations as described herein. The application may be used for communication across the network 150 and/or to view content agent evaluation.

For ease of discussion, the description herein refers to a single customer device 102, a single agent device 104, and a single supervisor device 106. But features and examples of the customer device 102, agent device 104, and supervisor device 106 are applicable to multiple devices. Further, it is contemplated that the agent device 104 and supervisor device 106 are interchangeable within the contact center as both devices are part of the larger contact center enterprise network.

The customer device 102, agent device 104, supervisor device 106, and scoring engine 120 may include at least one processor, such as content processor 122, that executes software and/or firmware stored in memory. The software/firmware code contains instructions that, when executed by the processor causes control logic to perform the functions described herein. The term "logic" or "control logic" as used herein may include software and/or firmware executing on one or more programmable processors, application-specific integrated circuits (ASICs), field-programmable gate arrays (FPGAs), digital signal processors (DSPs), hardwired logic, or combinations thereof. Therefore, in accordance with the embodiments, various logic may be implemented in any appropriate fashion and would remain in accordance with the embodiments herein disclosed In accordance with some embodiments, the customer device 102, agent device 104, supervisor device 106, and scoring engine 120 may have access to data contained in a data store 108 as well as the ability to store data in data store 108. The data store 108 may contain content related to agent-customer interactions, other agent information, and other data related to evaluating agent performance at providing the required interaction quality to the customer. Data store 108 is a network server, cloud server, network attached storage ("NAS") device, or another suitable computing device. Data store 108 may include one or more of any type of storage mechanism or memory, including a magnetic disc (e.g., in a hard disk drive), an optical disc (e.g., in an optical disk drive), a magnetic tape (e.g., in a tape drive), a memory device such as a random-access memory (RAM) device, a read-only memory (ROM) device, etc., and/or any other suitable type of storage medium. Although only one instance of the data store 108 is shown in FIG. 1, the system 100 may include two, three, or more similar instances of the data store 108. Moreover, the network 150 may provide access to other data stores, similar to data store 108 that are located outside of the system 100, in some embodiments.

As will be appreciated, the various methods, devices, apps, nodes, features, etc., described with respect to FIG. 1 or any of the figures described herein, are not intended to limit the system to being performed by the particular apps and features described. Accordingly, additional configurations may be used to practice the methods and systems herein and/or features and apps described may be excluded without departing from the methods and systems disclosed herein.

Figure 2:
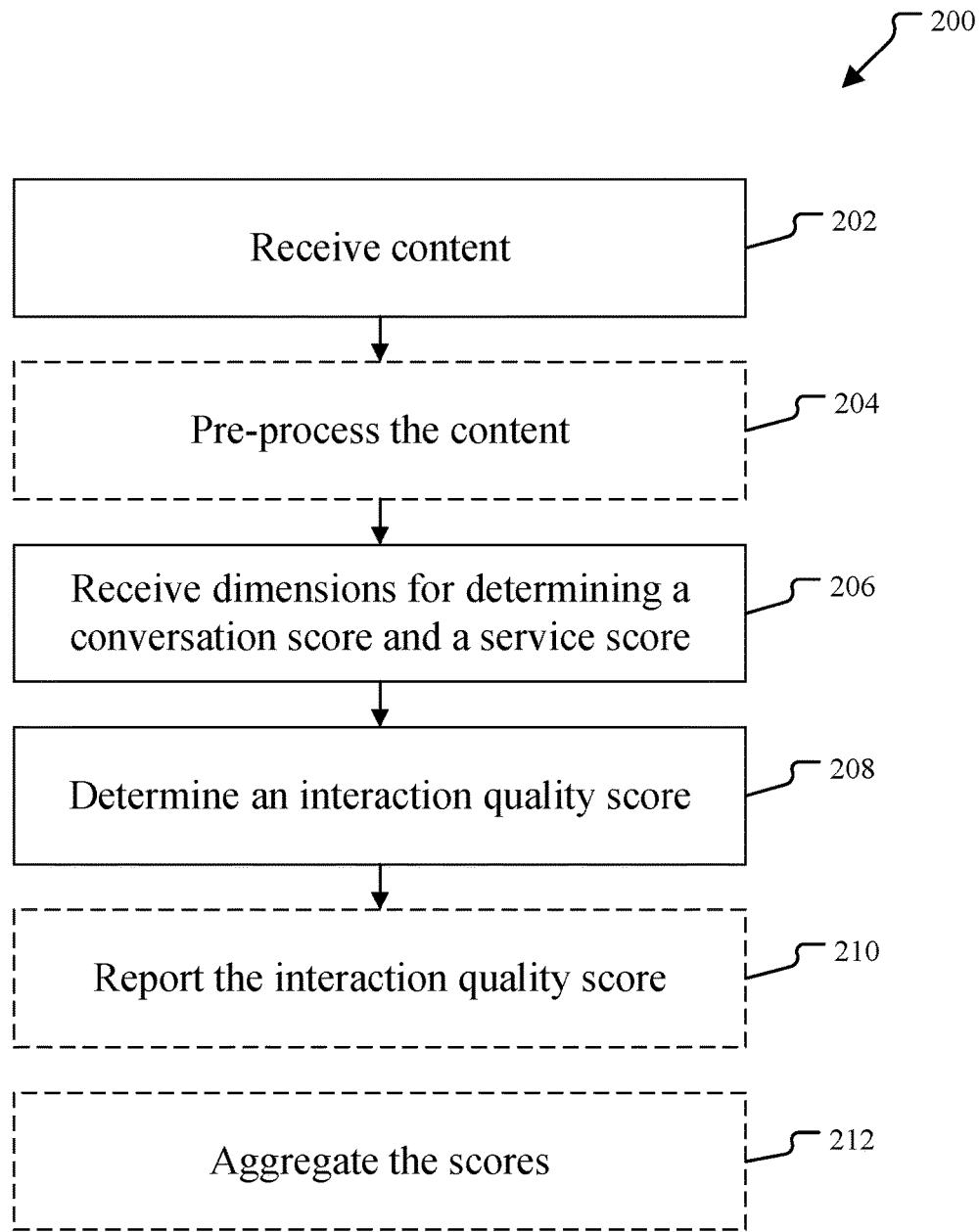
FIG. 2 is a block diagram illustrating a method for determining an interaction quality score, according to aspects described herein.

FIG. 2 is a block diagram illustrating a method for determining an interaction quality score, according to aspects described herein. A general order of the operations for the method 200 is shown in FIG. 2. Generally, the method 200 begins with operation 202 and ends with operation 212. The method 200 may include more or fewer steps or may arrange the order of the steps differently than those shown in FIG. 2. The method 200 can be executed as computer-executable instructions executed by a computer system and encoded or stored on a computer readable medium or other non-transitory computer storage media. Further, the method 200 can be performed by gates or circuits associated with a processor, an ASIC, an FPGA, a SOC or other hardware device. Hereinafter, the method 200 shall be explained with reference to the systems, components, devices, modules, software, data structures, data characteristic representations, signaling diagrams, methods, etc., described in conjunction with FIGS. 1, 3, 4, 5, and 6.

At operation 202, one or more pieces of content are received. The pieces of content are received by a content processor (e.g., content processor 122). The content is a record of interaction between an agent and a customer. The content may be a primarily audio, video, and/or text-based record or some combination thereof, that was previously recorded and stored in a data store (e.g., data store 108).

At operation 204, the content may be pre-processed by a content processor (e.g., content processor 122). In some embodiments, the content may need to be pre-processed into a transcript to simplify the analysis of the content. A transcript is a text-based record of the agent-customer interaction labeled for the whether the agent or customer is speaking. Operation 204 is an optional step as indicated by the dashed box for operation 204.

At operation 206, one or more dimensions are received by a dimension scoring engine (e.g., dimension scoring engine 124) to use in generating an interaction quality score. A dimension is a perspective from which the content may be analyzed and the agent-customer interaction may be evaluated. Many different dimensions could be received including fluency, relevance, appropriateness, informativeness, assurance, responsiveness, empathy, compliance, and/or sentiment dimensions among many others based on business and/or industry preferences. Some of the received dimensions will be used for determining a conversation score and others will be used for determining a service score, and will be identified as such when received. Some dimensions may be used to determine both the conversation score and service score, or there may be no overlapping dimensions between the conversation score and service score. For example, the dimension scoring engine may receive the dimensions fluency, relevance, and appropriateness for determining the conversation score and the dimensions informativeness, assurance, responsiveness, and empathy may be received for determining the service score.

At operation 208 an interaction quality score is determined based on the received dimensions. The interaction quality score is a comprehensive evaluation of agent performance during an agent-customer interaction that is generalizable across many industries for evaluating performance and improving customer service. The interaction quality score is determined by the interaction quality score module (e.g., interaction quality score module 130) combining a conversation score and a service score. The conversation score is determined by the conversation score module (e.g., conversation score module 126) by combining the dimension scores for the dimensions received for determining the conversation score. The service score is determined by the service score module (e.g., service score module 128) by combining the dimension scores received for determining the service score. The dimension scores for each of the conversation score and service score are determined by a dimension scoring engine (e.g., dimension scoring engine 124) by combining one or more metric scores for the metrics associated with each dimension.

At operation 210, the interaction quality score may be reported to a supervisor device (e.g., supervisor device 106) and/or agent device (e.g., agent device 104) by a scoring engine (e.g., scoring engine 120). The interaction quality score may be reported with information relating to how the score was generated as well as recommendations for additional training to improve agent performance, as required. Operation 210 is an optional step, as indicated by the dashed box.

At operation 212, any of the metric scores, dimension scores, conversation scores, service scores, and/or interaction quality scores may be aggregated to evaluate and/or compare the performance between an agent across multiple interactions, a team of agents, an entire contact center, and/or multiple contact centers across any period of time and/or interactions. The aggregation may be performed by an aggregation engine (e.g., aggregation engine 132).

Figure 3:
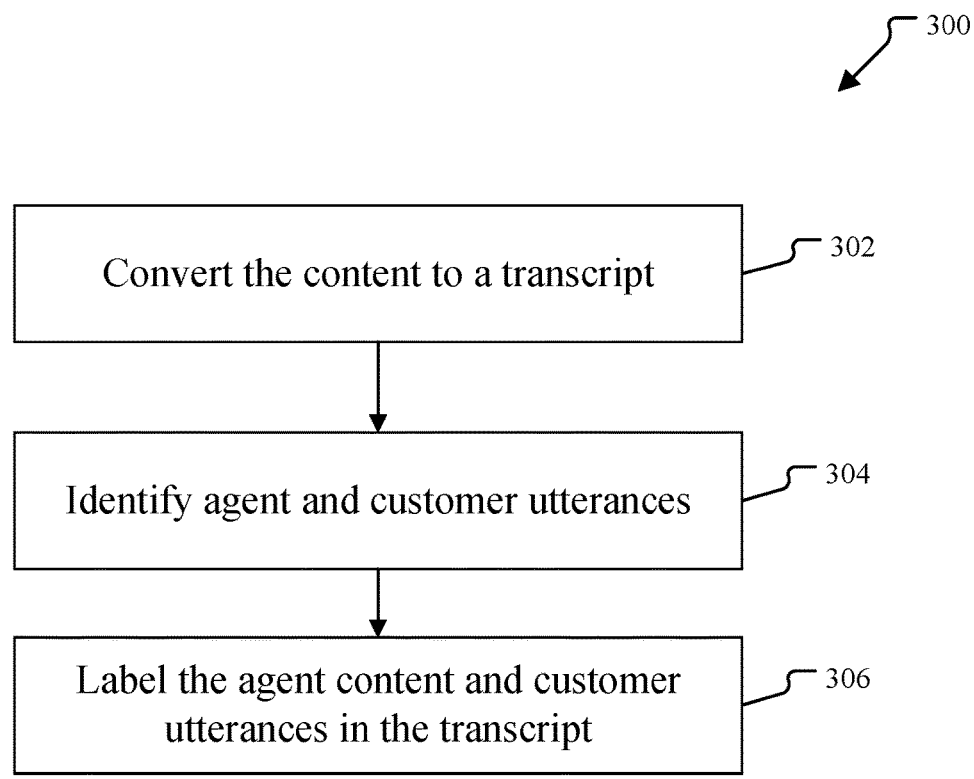
FIG. 3 is a block diagram illustrating a method for pre-processing a piece of content, according to aspects described herein.

FIG. 3 is a block diagram illustrating a method for pre-processing a piece of content, according to aspects described herein. A general order of the operations for the method 300 is shown in FIG. 3. Generally, the method 300 begins with operation 302 and ends with operation 308. The method 300 may include more or fewer steps or may arrange the order of the steps differently than those shown in FIG. 3. The method 300 can be executed as computer-executable instructions executed by a computer system and encoded or stored on a computer readable medium or other non-transitory computer storage media. Further, the method 300 can be performed by gates or circuits associated with a processor, an ASIC, an FPGA, a SOC or other hardware device. Hereinafter, the method 300 shall be explained with reference to the systems, components, devices, modules, software, data structures, data characteristic representations, signaling diagrams, methods, etc., described in conjunction with FIGS. 1, 2, 4, 5, and 6.

At operation 302, the content may be converted into a text-based transcript by a content processor (e.g., content processor 122). The content processor may use one or more natural language processing tools and/or other machine learning methods to review the piece of content and convert it into a text-based transcript.

At operation 304, agent and customer utterances are identified in the transcript by the content processor (e.g., content processor 122). The content processor may analyze the transcript to identify which utterances were made by the agent and which were made by the client. The content processor may use one or more of a speech recognition engine, one or more a large language models, natural language processing, and/or other machine learning methods to identify utterances from the transcript. In embodiments where the interaction includes more participants than a single agent and a single customer (e.g., multiple agents, a supervisor, etc.) then the content processor will identify utterances associated with each participant.

At operation 306, the identified utterances will be labeled for the agent or customer by the content processor (e.g., content processor 122). The utterances will be labeled with the participant who made the utterance and a time stamp for when the utterance occurred. In embodiments with more participants than a single agent and a single customer, each the utterances of each participant will be labeled.

Figure 4:
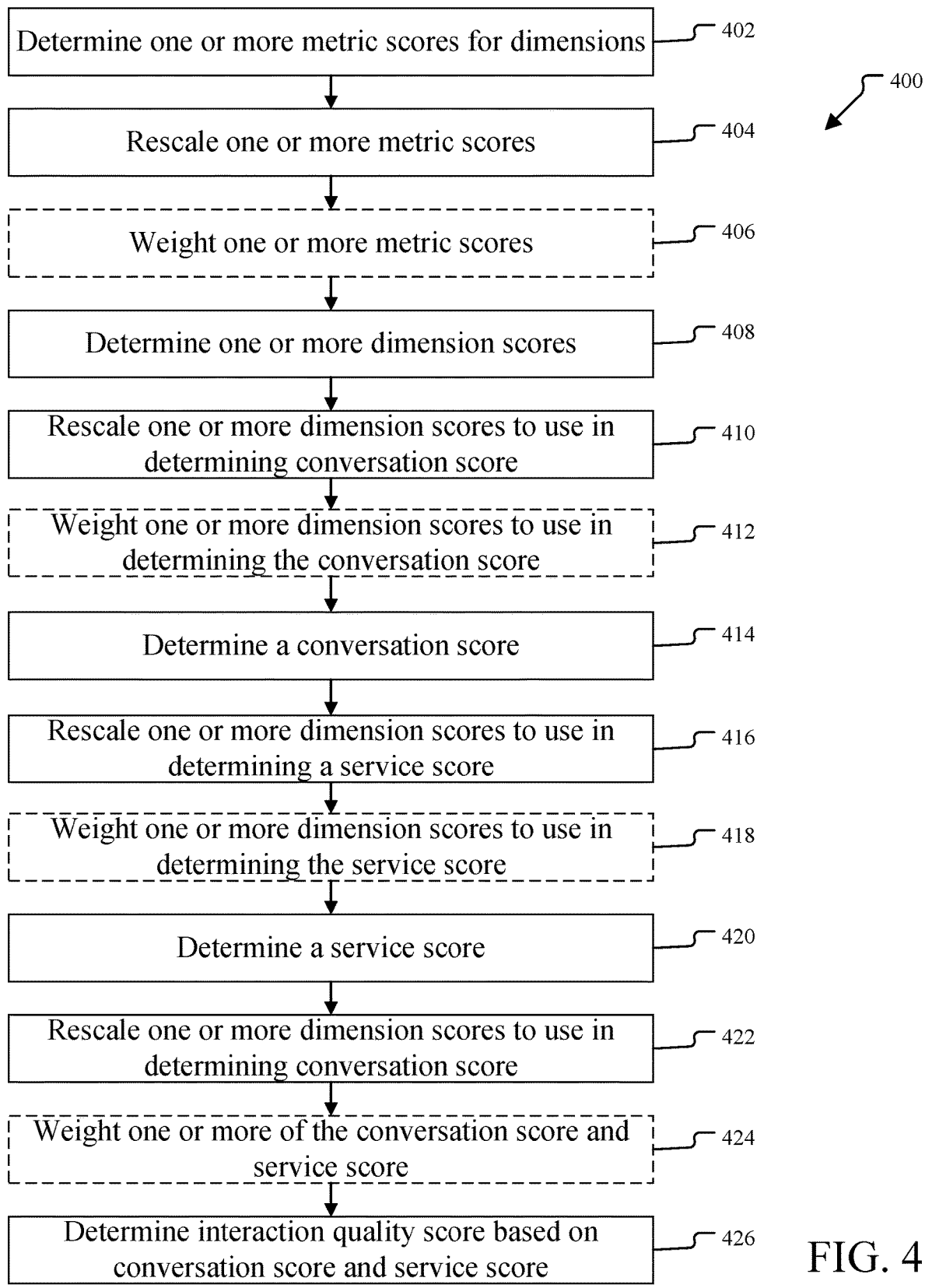
FIG. 4 is a block diagram illustrating a method for determining one or more dimension scores, a conversation score, a service score, and an interaction quality score, according to aspects described herein.

FIG. 4 is a block diagram illustrating a method for determining one or more dimension scores, a conversation score, a service score, and an interaction quality score according to aspects described herein. A general order of the operations for the method 400 is shown in FIG. 4. Generally, the method 400 begins with operation 402 and ends with operation 426. The method 400 may include more or fewer steps or may arrange the order of the steps differently than those shown in FIG. 4. The method 400 can be executed as computer-executable instructions executed by a computer system and encoded or stored on a computer readable medium or other non-transitory computer storage media. Further, the method 400 can be performed by gates or circuits associated with a processor, an ASIC, an FPGA, a SOC or other hardware device. Hereinafter, the method 400 shall be explained with reference to the systems, components, devices, modules, software, data structures, data characteristic representations, signaling diagrams, methods, etc., described in conjunction with FIGS. 1, 2, 3, 5, and 6.

At operation 402, one or more metric scores are determined for each dimension by a dimension scoring engine (e.g., dimension scoring engine 124). Each dimension is composed of one or more metrics which can be scored to refine the evaluation of interaction quality for that dimension. The metric score may be determined using one more machine learning and/or natural language processing methods which are applied based on the dimension. The metrics may be scored using one or more of a LIWC, MTS, ADM, non-textual features, other natural language processing tools, and/or other machine learning methods. For example, MTS is used to score the informativeness metrics which are boilerplate and specificity In another example, the appropriateness dimension may have three metrics such as prosocial behavior, politeness, and swear words which are scored using an LIWC.

At operation 404, the one or more metric scores are rescaled by the dimension scoring engine (e.g., dimension scoring engine 124). One or more of the metric scores for a dimension may be determined with a different unit of measurement applied based on the type of metric and machine learning tool used to determine it. As such, prior to determining the dimension score, the metric scores may need to be rescaled to ensure that the metric scores share a common unit of measurement for subsequent determinations. In some embodiments the rescaling may rescale the metric to a continuous value from 0 to 10 with 0 being the worst and 10 being the best.

At operation 406, the one or more metric scores may be optionally weighted by the dimension scoring engine (e.g., dimension scoring engine 124). The metric scores may be weighted by the dimension scoring engine to give preference to certain metrics in subsequent determinations. The weights applied may be fine-tuned based on business and/or industry preferences. Operation 406 is optional as indicated by the dashed box.

At operation 408, one or more dimensions scores may be determined by the dimension scoring engine (e.g., dimension scoring engine 124). The dimension score may be determined by combining one or more metric scores for the dimension. In some embodiments, the dimensions scores are determined by taking an average value of the one or more metric scores which comprise each dimension. If weighting is applied the dimension score will be a weighted average value. In some embodiments, combining the metric scores involves using a ranking system to rank the scores, and/or using a threshold based system to combine scores above a certain threshold.

At operation 410, one or more of the dimension scores which comprise the conversation score are rescaled to ensure each dimensions score shares a common unit of measurement, as described above, by the conversation score module (e.g., conversation score module 126). At operation 412, one or more of the dimension scores which comprise the conversation score may be optionally weighted to give preference to one or more dimension scores over others, as described above. The weighting may be done by the conversation score module (e.g., conversation score module 126). Operation 412 is optional as indicated by the dashed box.

At operation 414, a conversation score is determined from the one or more dimension scores by the conversation score module (e.g., conversation score module 126). The conversation score is a measure of how well an agent engages with a customer during the interaction. The conversation score is determined by combining the one or more dimension scores identified for the conversation score. In some embodiments, the conversation score is determined by taking an average value of the one or more dimension scores identified for the conversation score. If weighting is applied the conversation score will be a weighted average value. In some embodiments, combining the dimension scores involves using a ranking system to rank the scores, and/or using a threshold based system to combine scores above a certain threshold.

At operation 416, one or more of the dimension scores which comprise the service score are rescaled to ensure each dimensions score shares a common unit of measurement, as described above. The rescaling may be done by the service score module (e.g., service score module 128). At operation 418, one or more of the dimension scores which comprise the service score may be optionally weighted to give preference to one or more of the dimension scores over another. The weighting may be done by the service score module (e.g., service score module 128). Operation 418 is optional as indicated by the dashed box.

At operation 420, a service score is determined from the one or more dimension scores by the service score module (e.g., service score module 128). The service score is an evaluation of the quality of the agent's service during the interaction in terms of customer's perception of the agent's performance. The service score is determined by combining the one or more dimension scores identified for the conversation score. In some embodiments, the service score is determined by taking an average value of the one or more dimension scores identified for the service score. If weighting is applied the service score will be a weighted average value. In some embodiments, combining the dimension scores involves using a ranking system to rank the scores, and/or using a threshold based system to combine scores above a certain threshold.

At operation 422, one or more of the conversation score and service score are rescaled to ensure each dimensions score shares a common unit of measurement by the interaction quality score module (e.g., interaction quality score module 130) as described above. At operation 424, one or more of the conversation score and service score may be optionally weighted to give preference to one of the scores over the other. The weighting may be done by the interaction quality score module (e.g., interaction quality score module 130). Operation 424 is optional as indicated by the dashed box.

At operation 426, an interaction quality score is determined by combining the conversation score and service score by the interaction quality score module (e.g., interaction quality score module 130). In some embodiments, the interaction quality score is determined by taking an average value of the conversation score and service score. If weighting is applied the service score will be a weighted average value. In other embodiments, combining the conversation score and service score involves using a ranking system to rank the scores, and/or using a threshold based system to combine scores above a certain threshold.

Figure 5:
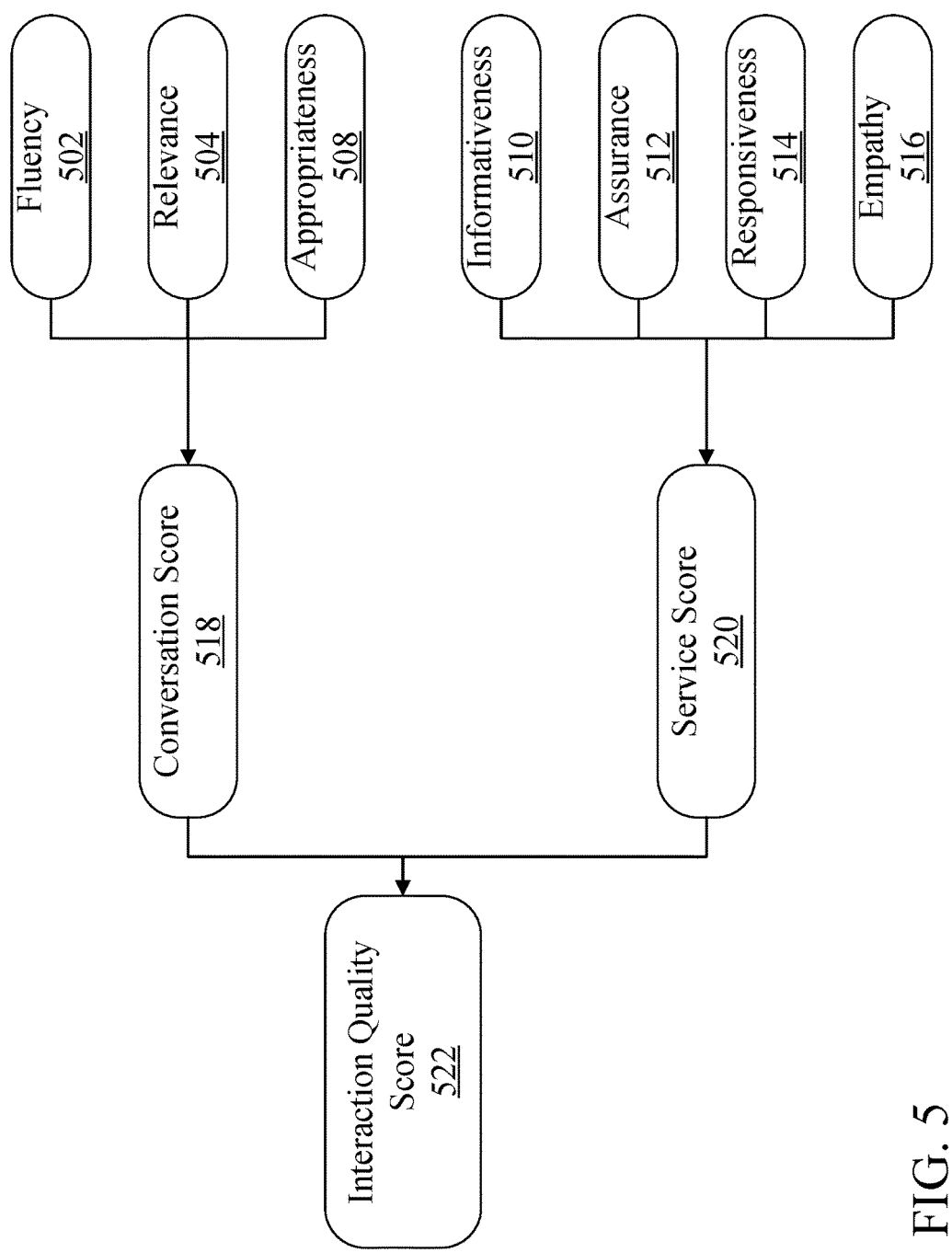
FIG. 5 illustrates an example of a framework with dimensions which may be used to determine an interaction quality score, according to aspects described herein.

FIG. 5 illustrates an example of a framework with dimensions which may be used to determine an interaction quality score, according to aspects described herein. As one non-limiting, non-exclusive example the dimensions of fluency 502, relevance 504, appropriateness 508 may be utilized by a scoring engine (e.g., scoring engine 120) to determine a conversation score 518, according to aspects described herein. Additionally, the dimensions informativeness 510, assurance 512, responsiveness 514, and empathy 516 may be utilized by a scoring engine (e.g., scoring engine 120) to determine a service score 520, according to aspects described herein. The conversation score 518 and service score 520 may be combined to determine an interaction quality score 522, according to aspects described herein.

Figure 6:
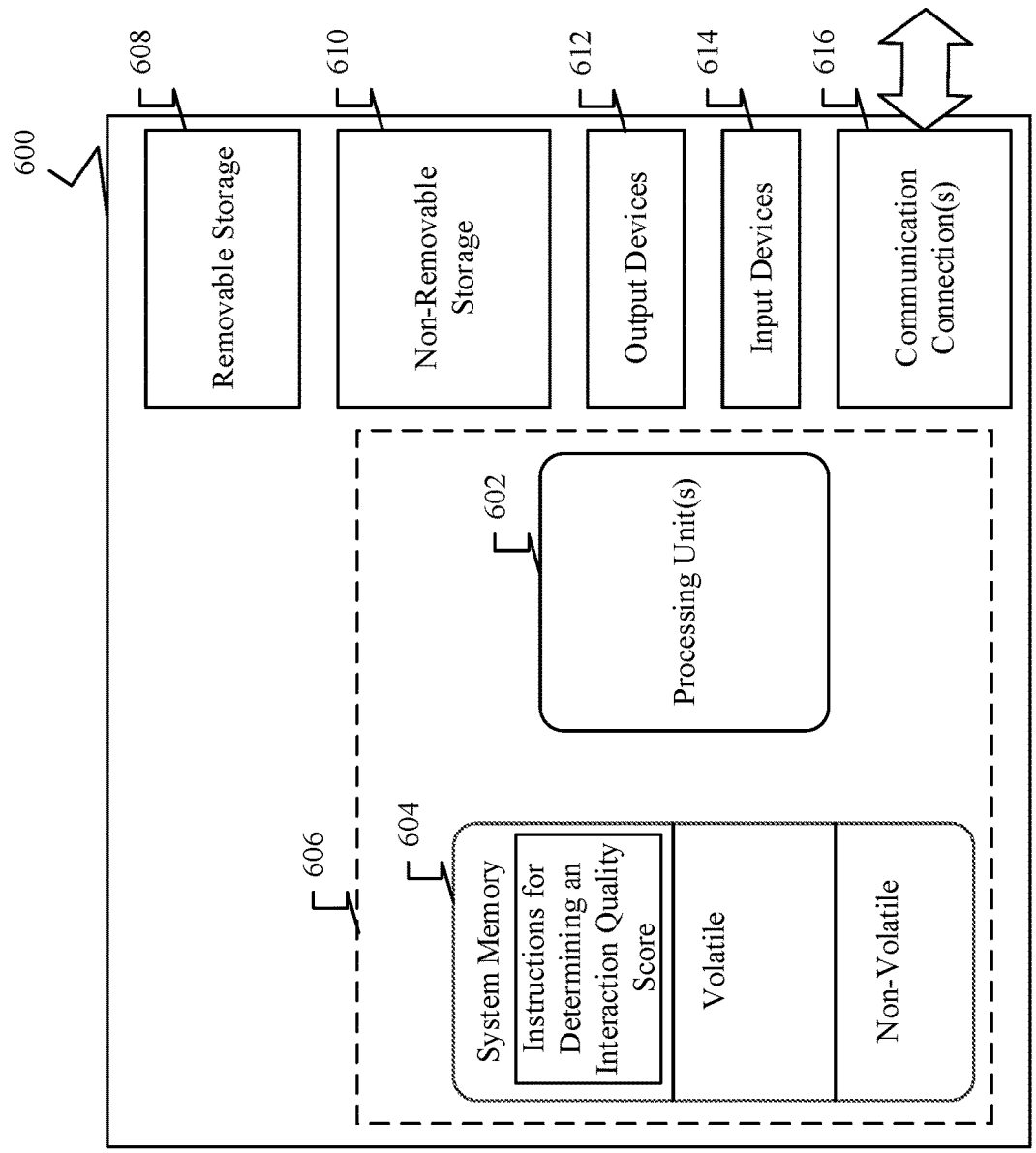
FIG. 6 illustrates a simplified block diagram of a device with which aspects of the present disclosure may be practiced, according to aspects described herein.

FIG. 6 illustrates a simplified block diagram of a device with which aspects of the present disclosure may be practiced, according to aspects described herein. The device may be a mobile computing device, for example. One or more of the present embodiments may be implemented in an operating environment 600. This is only one example of a suitable operating environment and is not intended to suggest any limitation as to the scope of use or functionality. Other well-known computing systems, environments, and/or configurations that may be suitable for use include, but are not limited to, personal computers, server computers, handheld or laptop devices, multiprocessor systems, microprocessor-based systems, programmable consumer electronics such as smartphones, network PCs, minicomputers, mainframe computers, distributed computing environments that include any of the above systems or devices, and the like.

In its most basic configuration, the operating environment 600 typically includes at least one processing unit 602 and memory 604. Depending on the exact configuration and type of computing device, memory 604 (e.g., instructions for determining an interaction quality score as disclosed herein) may be volatile (such as RAM), non-volatile (such as ROM, flash memory, etc.), or some combination of the two. This most basic configuration is illustrated in FIG. 6 by dashed line 606. Further, the operating environment 600 may also include storage devices (removable, 608, and/or non-removable, 610) including, but not limited to, magnetic or optical disks or tape. Similarly, the operating environment 600 may also have input device(s) 614 such as remote controller, keyboard, mouse, pen, voice input, on-board sensors, etc. and/or output device(s) 612 such as a display, speakers, printer, motors, etc. Also included in the environment may be one or more communication connections 616, such as LAN, WAN, a near-field communications network, a cellular broadband network, point to point, etc.

Operating environment 600 typically includes at least some form of computer readable media. Computer readable media can be any available media that can be accessed by the at least one processing unit 602 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. Computer storage media does not include communication media. Computer storage media does not include a carrier wave or other propagated or modulated data signal.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The operating environment 600 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in-offices, enterprise-wide computer networks, intranets and the Internet.

According to an embodiment of the present disclosure, a system is disclosed comprising at least one processor, and memory storing instructions that, when executed by the at least one processor, causes the system to perform a set of operations, the set of operations comprising receive a piece of content, wherein the piece of content is a record of an interaction between an agent and a customer, pre-process the piece of content into a labeled text-based transcript, receive one or more dimensions to utilize in determining an interaction quality score, wherein a dimension is comprised of one or more metrics, and determine an interaction quality score.

In various embodiments of the disclosure, further comprising report the interaction quality score, and aggregate the interaction quality score.

In various embodiments of the disclosure, wherein pre-process the piece of content further comprises convert the piece of content to a transcript, identify agent and customer utterances in the transcript, label the agent utterances including a time stamp in the transcript, and label the customer utterances including a time stamp in the transcript.

In various embodiments of the disclosure, wherein determine a interaction quality score further comprises determine a conversation score, wherein the conversation score is a measure of how well an agent engages with a customer during the interaction, determine a service score, wherein the service score is an evaluation of the quality of the agent's service during the interaction in terms of the customer's perception of the agent's performance, and determine a interaction quality score based on the conversation score and service score.

In various embodiments of the disclosure, wherein determine a conversation score further comprises determine one or more metric scores for the one or more dimensions to use in determining the conversation score, rescale one or more of the metric scores, weight one or more of the metric scores, determine a dimension score for each of the one or more received dimensions, rescale one or more of the dimension scores, weight one or more of the dimension scores, and determine the conversation score as a combination of the one or more dimension scores.

In various embodiments of the disclosure, wherein the dimensions to use to determine the conversation score comprise one or more of a fluency dimension, a relevance dimension, and an appropriateness dimension.

In various embodiments of the disclosure, wherein determine a service score further comprises, receive one or more dimensions to use in determining the service score, determine one or more metric scores for the one or more dimensions to use in determining the service score, rescale one or more of the metric scores, weight one or more of the metric scores, determine a dimension score for each of the one or more received dimensions, rescale one or more of the dimension scores, weight one or more of the dimension scores; and determine the service score as a combination of the one or more dimension scores.

In various embodiments of the disclosure, wherein the dimensions to use to determine the service score comprise one or more of an informativeness dimension, an assurance dimension, a responsiveness dimensions, and an empathy dimension.

In various embodiments of the disclosure, further comprising rescale one or more of the service score and conversation score; and weight one or more of the service score and conversation score.

In various embodiments of the disclosure, wherein the one or more dimensions to utilize to determine an interaction quality score comprise one or more of a fluency dimension, a relevance dimension, and an appropriateness dimension, an informativeness dimension, an assurance dimension, a responsiveness dimensions, an empathy dimension, a compliance dimension, and a sentiment dimension.

In various embodiments of the disclosure, a method is disclosed comprising receiving a piece of content, wherein the piece of content is a record of an interaction between an agent and a customer, pre-processing the piece of content into a labeled text-based transcript, receiving one or more dimensions to utilize in determining an interaction quality score, wherein a dimension is comprised of one or more metrics, and determining an interaction quality score.

In various embodiments of the disclosure, further comprising reporting the interaction quality score, and aggregating the interaction quality score.

In various embodiments of the disclosure, wherein pre-processing the piece of content further comprises converting the piece of content to a transcript, identifying agent and customer utterances in the transcript, labeling the agent utterances including a time stamp in the transcript, and labeling the customer utterances including a time stamp in the transcript.

In various embodiments of the disclosure, wherein determining an interaction quality score further comprises determining a conversation score, wherein the conversation score is a measure of how well an agent engages with a customer during the interaction, determining a service score, wherein the service score is an evaluation of the quality of the agent's service during the interaction in terms of the customer's perception of the agent's performance, and determining a interaction quality score based on the conversation score and service score.

In various embodiments of the disclosure, wherein determining a conversation score further comprises determining one or more metric scores for the one or more dimensions to use in determining the conversation score, rescaling one or more of the metric scores, weighting one or more of the metric scores, determining a dimension score for each of the one or more received dimensions, rescaling one or more of the dimension scores, weighting one or more of the dimension scores, and determining the conversation score as a combination of the one or more dimension scores.

In various embodiments of the disclosure, wherein the dimensions to use in determining the conversation score comprise one or more of a fluency dimension, a relevance dimension, and an appropriateness dimension.

In various embodiments of the disclosure, wherein determining a service score further comprises, receiving one or more dimensions to use in determining the service score, determining one or more metric scores for the one or more dimensions to use in determining the service score, rescaling one or more of the metric scores, weighting one or more of the metric scores, determining a dimension score for each of the one or more received dimensions, rescaling one or more of the dimension scores, weighting one or more of the dimension scores; and determining the service score as a combination of the one or more dimension scores.

In various embodiments of the disclosure, wherein the dimensions to use in determining the service score comprise one or more of an informativeness dimension, an assurance dimension, a responsiveness dimensions, and an empathy dimension.

In various embodiments of the disclosure, further comprising rescaling one or more of the service score and conversation score; and weighting one or more of the service score and conversation score.

In various embodiments of the disclosure, wherein the one or more dimensions to utilize in determining an interaction quality score comprise one or more of a fluency dimension, a relevance dimension, and an appropriateness dimension, an informativeness dimension, an assurance dimension, a responsiveness dimensions, an empathy dimension, a compliance dimension, and a sentiment dimension Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   memory storing instructions that, when executed by the at least one processor, causes the system to perform a set of operations, the set of operations comprising:
      receive a piece of content, wherein the piece of content is a record of an interaction between an agent and a customer;
      pre-process the piece of content into a labeled text-based transcript, wherein pre-processing the piece of content comprises providing an audio recording of the content to a machine learning model to generate the labeled text-based transcript, and wherein the machine learning model is operable to generate customer utterance labels and agent utterance labels for the labeled text-based transcript;
      receive one or more dimensions to utilize in determining an interaction quality score, wherein a dimension is comprised of one or more metrics, the one or more metrics are associated with a score generated by one or more additional machine learning models, the one or more additional machine learning models are selected based upon one or more metric types, and wherein the one or more dimensions comprise an informativeness dimension, wherein scoring the informativeness dimension further comprises:
         analyzing textual data using more than sentiment (MTS) frequency-based natural language processing (NLP) to quantify text structures in the labeled text-based transcript to determine information density for boilerplate information and specific information, wherein the information density is used to determine an informativeness score;
      determine the interaction quality score; and
      report the interaction quality score, wherein reporting the interaction quality score comprises:
         generating descriptive information related to how the interaction quality score was determined;
         generating a recommendation to improve agent performance; and
         sending the descriptive information, the recommendation, and the interaction quality score to a remote device.

2. The system of claim 1, further comprising aggregate the interaction quality score.

3. The system of claim 1, wherein pre-process the piece of content further comprises:
   convert the piece of content to the labeled text-based transcript;
   identify agent utterances and customer utterances in the labeled text-based transcript;
   label the agent utterances including a first time stamp in the labeled text-based transcript; and
   label the customer utterances including a second time stamp in the labeled text-based transcript.

4. The system of claim 1, wherein determine the interaction quality score further comprises:
   determine a conversation score, wherein the conversation score is a measure of how well the agent engages with the customer during the interaction;
   determine a service score, wherein the service score is an evaluation of a quality of service during the interaction in terms of the customer's perception of performance; and
   determine the interaction quality score based on the conversation score and the service score.

5. The system of claim 4, wherein determining the conversation score further comprises:
receive one or more conversation dimensions to use in determining the conversation score;
determine one or more metric scores for the one or more conversation dimensions to use in determining the conversation score;
rescale one or more of the one or more metric scores;
weight one or more of the one or more metric scores;
determine a dimension score for each of the one or more conversation dimensions;
rescale at least a first dimension score of the one or more of the dimension scores;
weight at least a second dimension score of the one or more of the dimension scores; and
determine the conversation score as a combination of the one or more dimension scores.

6. The system of claim 5, wherein the one or more conversation dimensions to use to determine the conversation score comprise one or more of a fluency dimension, a relevance dimension, and an appropriateness dimension.

7. The system of claim 4, wherein determining the service score further comprises:
receive one or more service dimensions to use in determining the service score;
determine one or more metric scores for the one or more service dimensions to use in determining the service score;
rescale one or more of the one or more metric scores;
weight one or more of the one or more metric scores;
determine a dimension score for each of the one or more service dimensions;
rescale at least a first service dimension score of the one or more of the dimension scores;
weight at least a second service dimension score of the one or more of the dimension scores; and
determine the service score as a combination of the one or more dimension scores.

8. The system of claim 7, wherein the one or more service dimensions to use to determine the service score further comprises one or more of an assurance dimension, a responsiveness dimension, and an empathy dimension.

9. The system of claim 4, further comprising:
rescale one or more of the service score and the conversation score; and
weight one or more of the service score and the conversation score.

10. The system of claim 1, wherein the one or more dimensions to utilize to determine the interaction quality score further comprises one or more of a fluency dimension, a relevance dimension, and an appropriateness dimension, an assurance dimension, a responsiveness dimension, an empathy dimension, a compliance dimension, and a sentiment dimension.

11. A method comprising:
receiving a piece of content, wherein the piece of content is a record of an interaction between an agent and a customer;
pre-processing the piece of content into a labeled text-based transcript, wherein pre-processing the piece of content comprises providing an audio recording of the content to a machine learning model to generate the labeled text-based transcript, and wherein the machine learning model is operable to generate customer utterance labels and agent utterance labels for the labeled text-based transcript;
receiving one or more dimensions to utilize in determining an interaction quality score, wherein a dimension is comprised of one or more metrics, the one or more metrics are associated with a score generated by one or more additional machine learning models, the one or more additional machine learning models are selected based upon one or more metric types, and wherein the one or more dimensions comprise an informativeness dimension, wherein scoring the informativeness dimension further comprises:
analyzing textual data using more than sentiment (MTS) frequency-based natural language processing (NLP) to quantify text structures in the labeled text-based transcript to determine information density for boilerplate information and specific information, wherein the information density is used to determine an informativeness score;
determining the interaction quality score; and
reporting the interaction quality score, wherein reporting the interaction quality score comprises:
generating descriptive information related to how the interaction quality score was determined;
generating a recommendation to improve agent performance; and
sending the descriptive information, the recommendation, and the interaction quality score to a remote device.

12. The method of claim 11, further comprising aggregating the interaction quality score.

13. The method of claim 11, wherein pre-processing the piece of content further comprises:
converting the piece of content to the labeled text-based transcript;
identifying agent utterances and customer utterances in the labeled text-based transcript;
labeling the agent utterances including a first time stamp in the labeled text-based transcript; and
labeling the customer utterances including a second time stamp in the labeled text-based transcript.

14. The method of claim 11, wherein determining the interaction quality score further comprises:
determining a conversation score, wherein the conversation score is a measure of how well the agent engages with the customer during the interaction;
determining a service score, wherein the service score is an evaluation of a quality of service during the interaction in terms of the customer's perception of performance; and
determining the interaction quality score based on the conversation score and the service score.

15. The method of claim 14, wherein determining the conversation score further comprises:
receiving one or more conversation dimensions to use in determining the conversation score;
determining one or more metric scores for the one or more conversation dimensions to use in determining the conversation score, wherein the one or more conversation dimensions comprise the informativeness dimension;
weighting one or more of the one or more metric scores;
determining a dimension score for each of the one or more conversation dimensions;
rescaling at least a first conversation dimension score of the one or more of the dimension scores;
weighting at least a second conversation dimension score of the one or more of the dimension scores; and determining the conversation score as a combination of the one or more dimension scores.

16. The method of claim 15, wherein the one or more conversation dimensions to use in determining the conversation score comprise one or more of a fluency dimension, a relevance dimension, and an appropriateness dimension.

17. The method of claim 14, wherein determining the service score further comprises:
   receiving one or more service dimensions to use in determining the service score;
   determining one or more metric scores for the one or more service dimensions to use in determining the service score;
   rescaling one or more of the one or more metric scores;
   weighting one or more of the one or more metric scores;
   determining a service dimension score for each of the one or more service dimensions;
   rescaling at least a first service dimension score of the one or more of the dimension scores;
   weighting at least a second service dimension score of the one or more of the dimension scores; and
   determining the service score as a combination of the one or more service dimension scores.

18. The method of claim 17, wherein the one or more service dimensions to use in determining the service score further comprises one or more of an assurance dimension, a responsiveness dimension, and an empathy dimension.

19. The method of claim 14, further comprising:
   rescaling one or more of the service score and the conversation score; and
   weighting one or more of the service score and the conversation score.

20. The method of claim 11, wherein the one or more dimensions to utilize in determining the interaction quality score further comprises one or more of a fluency dimension, a relevance dimension, and an appropriateness dimension, an assurance dimension, a responsiveness dimension, an empathy dimension, a compliance dimension, and a sentiment dimension.

* * * * *